US012783111B2

(12) United States Patent
Tamayo et al.

(10) Patent No.: US 12,783,111 B2
(45) Date of Patent: Nov. 3, 2026

(54) COMPUTER-BASED SYSTEMS AND PLATFORMS FOR PARTICIPANT ENGAGEMENT AND CONTINUITY DURING LIVE EVENTS AND METHODS OF USE THEREOF

(71) Applicant: Capital One Services, LLC, McLean, VA (US)

(72) Inventors: Bryan Tamayo, Allen, TX (US); Unique Carey, McLean, VA (US); Catherine Lovett, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 377 days.

(21) Appl. No.: 18/391,120

(22) Filed: Dec. 20, 2023

(65) Prior Publication Data

US 2025/0208755 A1 Jun. 26, 2025

(51) Int. Cl.

| | |
|---|---|
| ***G06F 3/04842*** | (2022.01) |
| ***G06F 3/16*** | (2006.01) |
| ***G10L 15/06*** | (2013.01) |
| ***G10L 15/26*** | (2006.01) |
| ***G10L 15/30*** | (2013.01) |

(52) U.S. Cl.

CPC .......... *G06F 3/04842* (2013.01); *G06F 3/167* (2013.01); *G10L 15/063* (2013.01); *G10L 15/26* (2013.01); *G10L 15/30* (2013.01)

(58) Field of Classification Search

CPC ... G06F 3/04842; G06F 3/167; G10L 15/063; G10L 15/26; G10L 15/30

See application file for complete search history.

(56) References Cited

U.S. PATENT DOCUMENTS

| | | | | |
|---|---|---|---|---|
| 6,119,147 | A * | 9/2000 | Toomey ............... | G06Q 10/109 719/329 |
| 9,032,441 | B2 | 5/2015 | Rance et al. | |
| 11,016,728 | B2 | 5/2021 | Flores et al. | |
| 11,455,599 | B2 | 9/2022 | Crawford et al. | |
| 12,182,502 | B1 * | 12/2024 | Nakajima ............ | G06F 40/169 |

(Continued)

FOREIGN PATENT DOCUMENTS

WO 2020/242624 A1 12/2020

*Primary Examiner* — William L Bashore
*Assistant Examiner* — Gregory A Distefano
(74) *Attorney, Agent, or Firm* — GREENBERG TRAURIG, LLP

(57) ABSTRACT

A method includes receiving event data from a first computing device of a first user of a plurality of users; transmitting the event data to an application executing on a plurality of second computing devices of a plurality of second users; receiving an audio data from an audio device at the live event; generating in real time a transcription data of the audio data; instructing the application to display the event data and the transcription data on the user interface; receiving user-specific data related to at least one of the event data or the transcription data from the plurality of second users; where the user-specific data is provided to the application via the user interface; generating a combined software container including a schema that allows to embed the user-specific data into the transcription data; instructing the application to display the combined software container on the user interface.

20 Claims, 9 Drawing Sheets

(56) References Cited

U.S. PATENT DOCUMENTS

| | | | | |
|---|---|---|---|---|
| 2003/0078973 | A1* | 4/2003 | Przekop | H04N 21/858<br>348/E7.071 |
| 2008/0276159 | A1* | 11/2008 | Narayanaswami | G06F 40/169<br>715/202 |
| 2015/0149929 | A1* | 5/2015 | Shepherd | H04L 12/1822<br>715/753 |
| 2019/0122766 | A1* | 4/2019 | Strader | G06F 40/279 |
| 2021/0174787 | A1* | 6/2021 | Nguyen | G10L 15/16 |
| 2022/0254348 | A1* | 8/2022 | Tay | G06F 16/345 |
| 2023/0112369 | A1* | 4/2023 | Chopra | G06F 18/10<br>705/304 |

* cited by examiner

COMPUTER-BASED SYSTEMS AND PLATFORMS FOR PARTICIPANT ENGAGEMENT AND CONTINUITY DURING LIVE EVENTS AND METHODS OF USE THEREOF

TECHNICAL FIELD

The present disclosure generally relates to computer-based systems and methods for event engagement and continuity. In particular, the present disclosure relates to computer-based systems and methods for improving in-person event engagement and continuity using real-time tools.

BACKGROUND

In-person meetings and conferences between business and professional people are a large and economic segment of the world economy. People generally attend these events for two main reasons—to learn and to meet people for personal and organizational betterment. Operationally, this means that the conference must function to provide excellence in information sharing, intellectual engagement of all participants during presentations, and networking opportunities throughout the event.

SUMMARY

In some embodiments, the present disclosure provides an exemplary technically improved computer-implemented method that includes at least the following steps of receiving, by at least one processor, event data from a first computing device of a first user of a plurality of users; where the event data is associated with a live event; transmitting, by the at least one processor, the event data to an application executing on a plurality of second computing devices of a plurality of second users of the plurality of users; receiving, by the at least one processor, an audio data in real-time from an audio device at the live event; generating, by the at least one processor, in real time, a transcription data of the audio data; transmitting, by the at least one processor, the transcription data, in real time, to the application executing on the plurality of second computing devices of a plurality of second users of the plurality of users; instructing, by the at least one processor, the application to display the event data on a user interface of the plurality of second computing devices; instructing, by the at least one processor, the application to display the transcription data, in real time, on the user interface of the plurality of second computing devices; receiving, by the at least one processor, via the application executing on the plurality second computing devices, at least one user-specific input data related to at least one of the event data or the transcription data from the plurality of second users of the plurality of users; where the at least one user-specific input data is provided to the application via the user interface of the plurality of second computing devices; where the user interface includes at least one tool for providing the user-specific input data via the application; aggregating, by the at least one processor, the at least one user-specific input data to form an aggregated user input data; generating, by the at least one processor, a combined software container including a schema that allows to embed the user-specific input data into the transcription data; training, by the at least one processor, a machine learning engine based on the combined software container to obtain a trained machine learning engine that is trained to generate a user-specific summary data; instructing, by the at least one processor, the application to display the combined software container on the user interface of the plurality of second computing devices; predicting, by the at least one processor, based on an historical user-specific input data of a second user of the plurality of second users and via the trained machine learning engine, a user-specific summary data; where the user-specific summary data includes at least one portion of the combined software container that has been updated when the second user has performed at least one activity; and instructing, by the at least one processor, the application to display the user-specific summary data and the combined software container on the user interface of a second computing device of the second user of the plurality of second users.

In some embodiments, the present disclosure provides an exemplary technically improved computer-based system that includes at least the following components of a computing device configured to execute software instructions that cause the computing device to at least: receive event data from a first computing device of a first user of a plurality of users; where the event data is associated with a live event; transmit the event data to an application executing on a plurality of second computing devices of a plurality of second users of the plurality of users; receive an audio data in real-time from an audio device at the live event; generate, in real time, a transcription data of the audio data; transmit the transcription data, in real time, to the application executing on the plurality of second computing devices of a plurality of second users of the plurality of users; instruct the application to display the event data on a user interface of the plurality of second computing devices; instruct the application to display the transcription data, in real time, on the user interface of the plurality of second computing devices; receive, via the application executing on the plurality of second computing devices, at least one user-specific input data related to at least one of the event data or the transcription data from the second users of the plurality of users; where the at least one user-specific input data is provided to the application via the user interface of the plurality of second computing devices; where the user interface includes at least one tool for providing the user-specific input data via the application; aggregate the at least one user-specific input data to form an aggregated user input data; generate a combined software container including a schema that allows to embed the user-specific input data into the transcription data; train a machine learning engine based on the combined software container to obtain a trained machine learning engine that is trained to generate a user-specific summary data; instruct the application to display the combined software container on the user interface of the plurality of second computing devices; predict, based on an historical user-specific input data of a second user of the plurality of second users and via the trained machine learning engine, a user-specific summary data; where the user-specific summary data includes at least one portion of the combined software container that has been updated when the second user has performed at least one activity; instruct the application to display the user-specific summary data and the combined software container on the user interface of a second computing device of the second user of the plurality of second users.

In some embodiments, the present disclosure provides an exemplary technically improved computer-based method that includes at least the following steps of receiving, by at least one processor, event data from a first computing device of a first user of a plurality of users; where the event data is associated with a live event; transmitting, by the at least one processor, the event data to an application executing on a plurality of second computing devices of a plurality of second users of the plurality of users; receiving, by the at least one processor, an audio data in real-time from an audio device at the live event; generating, by the at least one processor, in real time, a transcription data of the audio data; transmitting, by the at least one processor, the transcription data, in real time, to the application executing on the plurality of second computing devices of a plurality of second users of the plurality of users; instructing, by the at least one processor, the application to display the event data on a user interface of the plurality of second computing devices; instructing, by the at least one processor, the application to display the transcription data, in real time, on the user interface of the plurality of second computing devices; receiving, by the at least one processor, via the application executing on the at least one second computing device, at least one user-specific input data related to at least one of the event data or the transcription data from the plurality of second users of the plurality of users; where the at least one user-specific input data is provided to the application via the user interface of the plurality of second computing devices; where the user interface includes at least one tool for providing the user-specific input data via the application; aggregating, by the at least one processor, the at least one user-specific input data to form an aggregated user input data; generating, by the at least one processor, a combined software container including a schema that allows to embed the user-specific input data into the transcription data; instructing, by the at least one processor, the application to display the combined software container on the user interface of the plurality of second computing devices.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
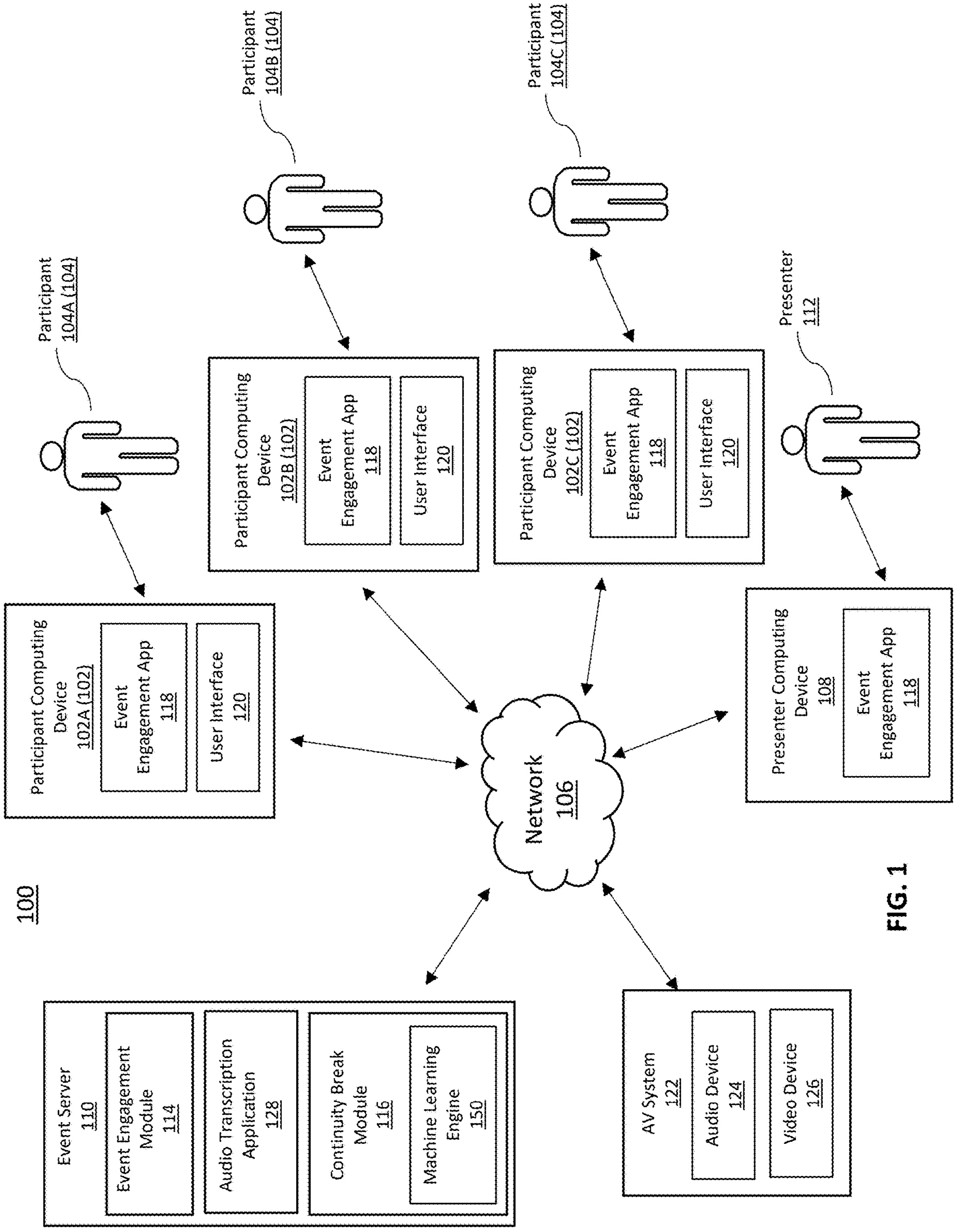
FIG. 1 is a block diagram illustrating an exemplary computer-based system for improving participant engagement and continuity at a live event, according to one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

As used herein, the term "customer", "client" or "user" shall have a meaning of at least one customer or at least one user respectively.

As used herein, the term "mobile computing device", "user device" or the like, may refer to any portable electronic device that may include relevant software and hardware. For example, a "mobile computing device" can include, but is not limited to, any electronic computing device that is able to among other things receive and process alerts from a customer or a financial entity including, but not limited to, a mobile phone, smart phone, or any other reasonable mobile electronic device that may or may not be enabled with a software application (App) from the customer's financial entity.

In some embodiments, a "mobile computing device" or "user device" may include computing devices that typically connect using a wireless communications medium such as cell phones, smart phones, tablets, laptops, computers, pagers, radio frequency (RF) devices, infrared (IR) devices, CBs, integrated devices combining one or more of the preceding devices, or virtually any mobile computing device that may use an application, software or functionality to receive and process alerts, credit offers, credit requests, and credit terms from a customer or financial institution.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, a live meeting environment may include a conference, a workshop, a business meeting, an academic setting, and the like. In some embodiments, the live meeting environment may include conferences for various industries, including, but not limited to, the financial services, pharmaceutical, educational industries and the like.

As used herein, the term "participant" or an "attendee" may refer to an individual attending a live event and viewing a presentation. Examples may include conference participants, students and the like. As used herein, the term "presenter" may refer to the one or more individuals providing the presentation and/or moderating the live meeting.

As used herein, the terms "live event," "live meeting," and like may include at least some participants physically attending with associated computing devices, at least some participants virtually attending via associated computing devices, or both.

In some setting, such as live, in-person events, extended meetings or conferences, often struggle with utilizing computing technology to maintain attendee engagement and continuity, especially when attendees need to exit prematurely or take temporary breaks.

An aspect of these live, in-person events may be that knowledge-seeking individuals may attempt to interact within physical spaces that contain large numbers of strangers, which may naturally lead to difficulties in personal communication. For example, within presentation rooms, speakers generally conduct mostly one-way dissemination of knowledge through slide projections onto screens with limited interaction with the audience. The attendees don't usually have access to the slides during the presentation. Notes on the presentation may be generally handwritten on paper or entered into other digital devices. The presenter's words may typically not be recorded for later review by attendees. Q&A sessions may be brief and at the end of the presentation, with only a very few attendees able to interact with the presenter. There may be also almost no interaction between members of the audience unless they are sitting next to each other. Lastly, the presenter may never really know who most of an audience is and what they really thought about the various slides and the presentation.

Existing solutions for enhancing event engagement may lack comprehensive and personalized interactive features. While event apps and platforms offered some level of engagement, they may not provide interactive, participant-tailored experiences or functionality such as, for example, personalized slide decks, interactive highlighting and seamless transitions. Additionally, yet another technological problem is how to capture presented content and preserve continuity during break moments, leading to disconnection and missed content.

FIGS. 1 through 9 illustrate systems and methods for enhancing attendee engagement and continuity during live events by using an interactive system. In some embodiments, the interactive system provides attendees with interactive features during a live event including, for example, real-time transcriptions, interactive functionality and networking features via a mobile application. In some embodiments, when a participant leaves or takes a break from the live event, the system may ensure seamless catch-up experiences by providing recaps, personalized recommendations and integration back into a live event. The following embodiments provide technical solutions and technical improvements that overcome technical problems, drawbacks and/or deficiencies in the technical fields involving real-time user-driven digital interaction with a live presentation. As explained in more detail, below, the present disclosure provides technically advantageous computer architecture that provides an interactive, user-specific, real-time experience for each participant at a live event. In some embodiments, the system and methods are technologically improved by being programmed with machine-learning to predict user-specific summaries of missed presentation content based on user-specific input data. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram illustration of an exemplary system 100 for improved meeting engagement in accordance with some embodiments of the present disclosure. The components and arrangements shown in FIG. 1 are not intended to limit the disclosed embodiments as the components used to implement the disclosed processes and features may vary. In accordance with disclosed embodiments, the system 100 may include an event server 110 in communication with a plurality of participant computing devices 102A, 102B . . . 102N, collectively 102, associated with a plurality of participants 104A, 104B . . . 104N, collectively 104, via a network 106. In some embodiments, the network 106 may also be communicatively coupled to at least one presenter computing device 108 associated with at least one presenter 112. In some embodiments, the system 100 also includes an audio-visual (AV) system 122 including an audio device 124 (e.g., microphone) and a video device 126 (e.g., camera).

Network 106 may be of any suitable type, including individual connections via the internet such as cellular or Wi-Fi networks. In some embodiments, network 106 may connect participating devices using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

In some embodiments, the event server 110 may include hardware components such as a processor (not shown), which may execute instructions that may reside in local memory and/or transmitted remotely. In some embodiments, the processor may include any type of data processing capacity, such as a hardware logic circuit, for example, an application specific integrated circuit (ASIC) and a programmable logic, or such as a computing device, for example a microcomputer or microcontroller that includes a programmable microprocessor.

Examples of hardware components may include one or more processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the event server 110 may include one or more logically or physically distinct systems. As further described herein, the event server 110 may perform operations (or methods, functions, processes, etc.) that may require access to one or more peripherals and/or modules. In the example of FIG. 1, the event server 110 includes an event engagement module 114 and a continuity break module 116.

In some embodiments, the plurality of participant computing devices 102 and/or the at least one presenter computing device 108 may generally include at least computer-readable non-transient medium, a processing component, an Input/Output (I/O) subsystem and wireless circuitry. In some embodiments, these components may be coupled by one or more communication buses or signal lines. In some embodiments, the plurality of participant computing devices 102 and/or the at least one presenter computing device 108 may include a microprocessor, a memory, a contactless communication interface having a communication field and a display. In some embodiments, the plurality of participant computing devices 102 and/or the at least one presenter computing device 108 may also include means for receiving user input, such as a keypad, touch screen, voice command recognition, a stylus, and other input/output devices, and the display may be any type of display screen, including an LCD or LED display. In some embodiments, the plurality of participant computing devices 102 and/or the at least one presenter computing device 108 may be a mobile computing device. In some embodiments, exemplary mobile computing devices include, without limitation, smartphones, laptop computers, tablet computers, a personal digital assistant, a palmtop computer, or other portable computing device.

In some embodiments, wireless circuitry may be used to send and receive information over a wireless link or network to one or more other devices' suitable circuitry such as an antenna system, an RF transceiver, one or more amplifiers, a tuner, one or more oscillators, a digital signal processor, a CODEC chipset, memory, etc. The wireless circuitry may use various protocols, e.g., as described herein. In some embodiments, the plurality of participant computing devices 102 and/or the at least one presenter computing device 108 may have data connectivity to a network, such as the Internet, via a wireless communication network, a cellular network, a wide area network, a local area network, a wireless personal area network, a wide body area network, or the like, or any combination thereof. In some embodiments, through this connectivity, the plurality of participant computing devices 102 and/or the at least one presenter computing device 108 may communicate with the event server 110.

In some embodiments, at least one of the plurality of participant computing devices 102 may include an application such as an event engagement application 118 (or application software) associated with an entity providing or holding the event. In some embodiments, the event engagement application 118 may include program code (or a set of instructions) that performs various operations (or methods, functions, processes, etc.), as further described herein.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the at least one presenter computing device 108 may include the event engagement application 118. In some embodiments, the event engagement application 118 may have a presenter portal and presenter interface as well as a participant portal and participant interface. In some embodiments, the presenter portal and the presenter interface may have different functionalities than the participant portal and the participant interface.

It should be apparent that the architecture described is only one example of an architecture for the plurality of participant computing devices 102 and/or the at least one presenter computing device 108, and that the plurality of participant computing devices 102 and/or the at least one presenter computing device 108 may have more or fewer components than shown, or a different configuration of components. The various components described above can be implemented in hardware, software, or a combination of both hardware and software, including one or more signal processing and/or application specific integrated circuits.

In some embodiments, as described above, the AV system 122 may include at least one microphone 124 and at least one camera 126 in communication with the event server 110 via the network 106. In some embodiments, the AV system 122 may also include at least one audio transcription application 128 generated by the event server 110, as will be described in further detail below. In some embodiments, the AV system 122 may be housed in a single device, such as the at least one presenter computing device 108. For example, in some embodiments, a microphone and a camera of the at least one presenter computing device 108, such as a smartphone or a laptop computer, may be utilized and configured to cooperate with the AV system 122. In some embodiments, the AV system 122 may be distributed across a plurality of devices and/or a network of devices. For example, in some embodiments, the at least one microphone 124 or the at least one camera 126 may be external to the at least one presenter computing device 108. In some embodiments, the at least one microphone 124 is separate from the at least one presenter computing device 108, such that the at least one microphone 124 may be placed closer to the at least one presenter 112 or arranged to be portable. For example, in some embodiments, the at least one microphone 124 may include a movable or wireless microphone placed on or near the at least one presenter 112. Additionally, or alternatively, the at least one microphone 124 may include a stationary microphone at or near a podium or other structure at which the at least one presenter 112 is positioned.

In some embodiments, microphones and cameras that are separate from the at least one presenter computing device 108 may transmit audio recordings and video recording, respectively, to the at least one presenter computing device 108 through audio wires, or wirelessly using common wireless transmission means known in the art. Such wireless transmission means may include, but are not limited to Bluetooth connections or wireless internet connections.

In some embodiments, the AV system 122 may comprise an AV processor that is external to and separate from the at least one presenter computing device 108. In these embodiments, the AV processor may be communicatively coupled to the at least one presenter computing device 108 via the network 106. In some embodiments, the audio transcription application 128 may be accessed and utilized by presenter computing device 108, with the resulting transcription data sent to each of the plurality of participant computing devices 102, all in real-time or substantially in real-time.

In some embodiments, the AV system 122 may be configured to utilize multiple microphones and corresponding audio streams, multiple cameras and corresponding video streams and multiple locations as suitable.

In some embodiments, the audio recording, or audio data, that the AV system 122 captures using the at least one microphone 124 may be transmitted to the event server 110 using any suitable transmission modality. In some embodiments, the transcribed audio is then delivered to each of the plurality of participant computing devices 102. Similarly, in some embodiments, the video recording, or video data, that the AV system 122 captures using the at least one camera 126 may be transmitted to the event server 110 using any suitable transmission modality and stored, recorded, and transmitted to each of the plurality of participant computing devices 102.

In some embodiments, the AV system 122 may be dispersed across and facilitate access and participation by a virtually unlimited number of participants, allowing a single live lecture, presentation, or event to be broadcast with live, automatic audio transcription, edited in real-time, to all participants. In some embodiments, the AV system 122 may utilize web socket connections, a real-time database, and the Web Real-Time Communication standard to allow any number of connections simultaneously.

In some embodiments, the plurality of participants 104 may use the plurality of participant computing devices 102 to access the event engagement application 118 generated by the event server 110 via a user interface 120 on the plurality of participant computing devices 102. In some embodiments, the user interface 120 may be configured to display the presentation, transcription data of the audio stream and/or related materials for the presentation to each of the plurality of participants 104. In some embodiments, the user interface 120 on the plurality of participant computing devices 102 may be configured to receive user-specific input data from each of the plurality of participants 104. Examples of user-specific inputs include, but are not limited to, interactive notes and highlighting, saved slides, polling information, responses to surveys, questions submitted by the plurality of participants 104, answers to queries presented on the user interface 120, comments on the displayed slides, etc.

Figure 2:
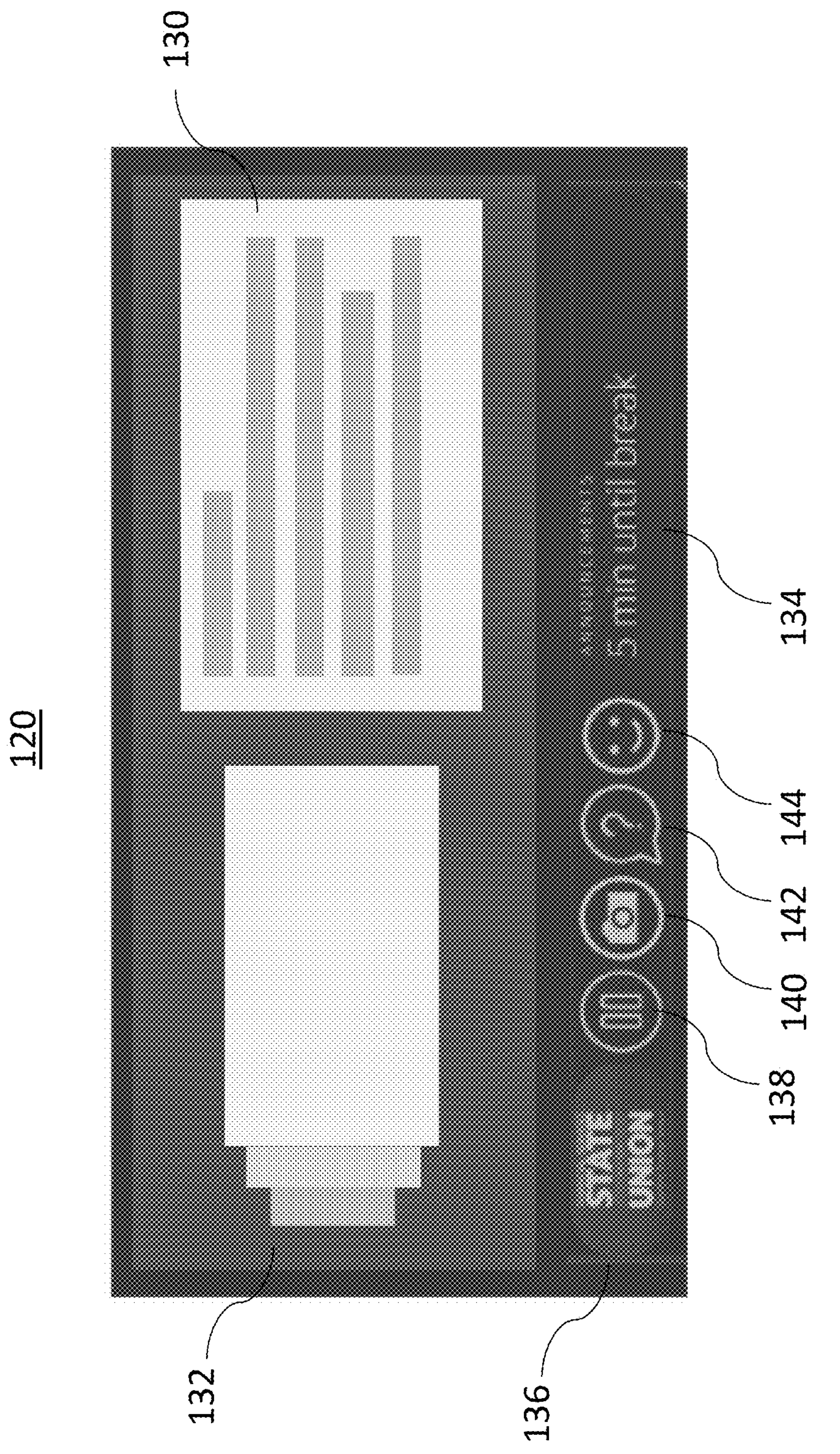
FIG. 2 is a block diagram illustrating an exemplary user interface of an event engagement application, according to one or more embodiments of the present disclosure.

FIG. 2 depicts an example user interface 120, according to some embodiments of the present disclosure. In some embodiments, the user interface 120 facilitates real-time engagement with presentation slides, transcription text and/or other presentation materials. In some embodiments, the user interface 120 may comprise a transcription interface 130 in which the real-time or substantially real-time transcription data of an automatic transcription is displayed. In some embodiments, the transcription interface 130 may allow the plurality of participants 104 to highlight portions of the transcript text via, for example, a touch interface. In some embodiments, the user interface 120 may also include a presentation interface 132 in which the slides of the presentation is displayed. In some embodiments, the presentation interface 132 may allow the plurality of participants 104 to view slides of the presentation, as will be described in further detail below. In some embodiments, the user interface 120 may also include an announcements section 134 in which announcements related to the live event may be displayed. For example, in some embodiments, the announcements section 134 may provide live alerts from event staff of reminders, instructions or upcoming presentations/seminars. In some embodiments, the user interface 120 may further include a participant engagement interface 136 which allows the plurality of participants 104 to engage with presentation materials, as will be described in further detail below. For example, in some embodiments, the participant engagement interface 136 may include a pause button 138, a screenshot button 140, a questions button 142, a "Like" button 144, etc. In some embodiments, as used herein, a button may be used to describe a touch interface selection.

As shown in FIG. 1, in some embodiments, the event server 110 may be configured to execute the event engagement module 114 which offers participants the personalized interactive features during the live event, via the event engagement application 118. In some embodiments, the event engagement module 114 may be implemented as an application (or set of instructions) or software/hardware combination configured to perform operations for allowing a participant to interact with a presentation in real-time. In some embodiments, the event engagement module 114 may utilize participant data and interactions with a presentation during the live event to allow participants to connect and interact with other participants through networking features, fostering collaboration and idea exchange.

In some embodiments, the event server 110 may receive presentation data from the presenter computing device 104. In some embodiments, the presenter computing device 104 may generate presentation data including a time-stamp for the display of each slide within a presentation. In some embodiments, the presentation data may then be stored on a database by the event server 110. In some embodiments, the presentation data may include the content displayed to the plurality of participants 104.

In some embodiments, the event server 110, via the event engagement module 114, may be configured to push presentation data to the plurality of participant devices 102 based on a command received from the at least one presenter computing device 108. In some embodiments, the presentation data may include slides associated with the presentation, timing information for when each slide is pushed to a participant computing device, polling questions, and the like. For example, in some embodiments, the at least one presenter 112 may initiate a command from the at least one presenter computing device 108, for the presentation displayed on the plurality of participant computing devices 102 to move to the next slide.

In some embodiments, each slide from, for example, PowerPoint or Keynote or other similar program, can be shared in real time from the at least one presenter computing device 108 to each of the at least one participant device 102 at a presentation location. In some embodiments, the at least one presenter 112 allows the plurality of participants 104 to see the slides on the plurality of participant computing devices 102 in the same order as the presenter, for example, projects them (synchronous mode) onto a projector screen located near a wall in the room. In some embodiments, the plurality of participants 104 are also able to revert back and examine previous slides during the presentation (asynchronous mode) while the at least one presenter 112 moves forward with the presentation in a linear fashion.

In some embodiments, in-conference content sharing is made possible by digital software and hardware systems (e.g., the event server 110, the event engagement application 118, etc.) that allow slide sharing in real-time between the at least one presenter 112 and each of the plurality of participants 104. In some embodiments, as discussed above, the digital software and hardware also allow the plurality of participants 104, through the plurality of participant computing devices 102, to note-take or highlight portions of the slide that he/she finds important. In some embodiments, the plurality of participants 104 is able to send questions through the plurality of participant computing devices 102 to the at least one presenter 112 and also see questions submitted by other participants. In some embodiments, these questions may be "Liked," using the like button 144, by other participants and thereby rise in priority for reply by the at least one presenter 112. Moreover, in some embodiments, the at least one presenter 112 can send a digital survey or polling questions to each of the plurality of participant computing devices 102 for reply at any time during the live presentation. In some embodiments, the event server 110 may store any participant response or user-specific input data (i.e., note-taking, highlighting) in a server database.

In some embodiments, user-specific input data may include participant feedback provided using pre-/post-presentation surveys, polling questions, participant questions and participant notes. In some embodiments, the user-specific input data may include responses to polling questions including single, multi-select, priority-ranking, ratings, and open-response questions. In some embodiments, the user-specific input data may also include responses to survey questions indicative of participant demographics, knowledge/confidence level, experience, and feedback. In some embodiments, user-specific input data may be collected through the event engagement application 118 run on the plurality of participant computing devices 102. In some embodiments, the user-specific input data may then be transmitted to the event server 110 for storage.

In some embodiments, the plurality of participants 104 may easily and instantly access the presentation data and materials via the plurality of participant computing devices 102. In some embodiments, the plurality of participants 104 may use the plurality of participant computing devices 102 to access the event engagement application 118 generated by the event server 110 via the user interface 120 on the plurality of participant computing devices 102. In some embodiments, the user interface 120 may be configured to display the presentation and/or related materials for the presentation to the plurality of participants 104. In some embodiments, the user interface 120 on the plurality of participant computing devices 102 may be configured to receive input from the plurality of participants 104. For example, in some embodiments, the plurality of participants 104 may type in notes, save comments on a slide, navigate through past slide of the presentation, answer a question presented to the plurality of participants 104 via polling questions or queries provided by the at least one presenter 112, and/or rate a slide. In some embodiments, this data may form at least a portion of the user-specific input data.

In some embodiments, the plurality of participants 104 may also review past slides as needed, and synchronize (catch up) to the presenters slide with a click of a user interface button on the participant computing device. In some embodiments, the plurality of participants 104 may "Like" slides, via the like button 144, and takes notes linked to a particular slide which are stored for later retrieval from the event server 110.

In some embodiments, the at least one presenter 112 may obtain instant feedback from the plurality of participants 104 via the event engagement module 114. This feedback may be useful in informing the at least one presenter 112 about how the plurality of participants 104 interacted with the content. In some embodiments, the at least one presenter 112 is able to control the content that the plurality of participants 104 receive by allowing the plurality of participants 104 to delete, update, hide and pin slide content. In some embodiments, the at least one presenter 112 is also able to manage all aspects of the content of each presentation in real time, including question and answer sessions and surveys. In some embodiments, the at least one presenter 112 may also manage the content of the presentation to suit the specific needs of future conferences or events.

In some embodiments, the at least one presenter 112 may at any time during a presentation initiate a digitally-driven Q&A session with the plurality of participants 104 by clicking a button on the presenter-side of the event engagement application 118. In some embodiments, the software of the event engagement application 118 features methods to prioritize the list of questions submitted by the plurality of participants 104 as for example by polling of "Like" responses from anyone in attendance to each of the questions. In some embodiments, questions may be viewed instantly by the plurality of participants 104 in a presentation and each question may be tagged with a participant's name. In some embodiments, questions are also linked to the slide that was being shown at the time the question was posed in digital format.

In some embodiments, the at least one presenter 112 may also instantly request a digital survey of the plurality of participants 104 at any time during the presentation by clicking a button on the presenter-side of the event engagement application 118. In some embodiments, the survey may be automatically pushed to the plurality of participant computing devices 102 for reply. In some embodiments, survey results may be summarized in graphs and tables in digital format for viewing by the at least one presenter 112, organizer, and plurality of participants 104 at any time during or after a conference.

In at least one embodiment, as described above, the system 100 transcribes the audio recording using the audio transcription application 128 and displays the transcription data in real-time, via the even engagement application 118, as the at least one microphone 124 generates the audio recording. In some embodiments, the at least one presenter computing device 108 may transmit the audio recording to the audio transcription application 128 that transcribes the audio recording into text.

In some embodiments, the audio transcription application 128 includes a web-based application accessed by the at least one presenter computing device 108. Alternatively, in some embodiments, the audio transcription application 128 is a software application stored on the at least one presenter computing device 108. In some embodiments, the audio transcription application 128 includes voice-to-text transcription capabilities which can transcribe the audio recording into text for the event engagement application 118 to transmit to the user interface 120 of each of the plurality of participant computing devices 102. In some embodiments, voice-to-text transcription capabilities, may include any suitable voice-to-text transcription modality, including suitable artificial intelligence ("AI") transcription packages.

As depicted in FIG. 1, and as described above, in some embodiments, the at least one microphone 124 records audio data from the at least one presenter 112 and transmits the audio data to the at least one presenter computing device 108. In some embodiments, the at least one presenter computing device 108 transmits the audio received from the at least one microphone 124 to the event server 110, for example through the audio transcription application 128. In some embodiments, the at least one microphone 124 transmits the audio data directly to the event server 110 for transcription. In some embodiments, the event server 110 transcribes the audio into text through any suitable transcription modality as described above. In some embodiments, the transcription data may then be transmitted to the at least one presenter computing device 108 and/or the plurality of participant computing devices 102 to be displayed via the event engagement application 118.

In some embodiments, the event engagement application 118 provides the transcription data to the plurality of participant computing devices 102 in real-time. That is, in some embodiments, the event server 110 transmits the transcription data to the at least one presenter computing device 108 word-for-word as the audio is transcribed. In some embodiments, the event server 110 does not translate in batches of sentences or paragraphs. Rather, in some embodiments, the event server 110 transmits interim results of sentences and paragraphs being transcribed, meaning word-for-word transcription, back to the at least one presenter computing device 108.

In some embodiments, user-specific input data from each of the plurality of participants 104 who engaged with the presentation may be aggregated and shared through the event engagement application 118. In some embodiments, the user-specific input data may be aggregated with respect to any requested or unrequested user inputs (e.g., participant transcript highlights, participant "likes," participant slide saves, participant poll or query responses, etc.). For example, in some embodiments, the event engagement module 114 may aggregate all portions of the presentation that was highlighted by each participant that engaged with the transcript. In some embodiments, the event engagement module 114 may then determine which portions of the transcript were highlighted the most. In some embodiments, the event engagement module 114 may, in the alternative, determine which portions of the transcript were highlighted above a certain predetermined threshold (e.g., highlighted by 10, 15, 20, 30 different participants). In some embodiments, the event engagement module 114 may then, via the event engagement application 118, display these portions of the transcript with a visual marking indicating that the portion of the transcript were marked as important or relevant by participants. For example, in some embodiments, the event engagement application 118 may highlight these portions of the transcript in a different color than that used for participant highlight input.

In some embodiments, the event engagement module 114 may be configured to determine key metrics indicating participant engagement levels, participant engagement level over time, how participants rate meetings, popularity of additional content, and key words. In some embodiments, the event engagement module may determine engagement metrics on a slide-by-slide basis. Further, in some embodiments, a data analytics module may be configured to perform statistical distributions and generate visualizations of the computed statistical distributions and the like that may then be integrated into a report by the event engagement module 114.

In some embodiments, key metrics may include a total count of participants, top participants based on engagement actions, percentage of participants who engaged with a content based on their actions (e.g., saving a slide, responding to polling questions, etc.), percentage of highly engaged participants (e.g., participants who took text notes, stylus notes, submitted questions), total number of actions, actions by action types, response rates to polling questions, response rates to survey questions, percentage of correction questions, experience ratings, counts of actions over time, word cloud, engagement levels by slide, response graphs by questions, participant identification, participant profiles, and the like. In some embodiments, a participant profile may indicate what content a participant responded to, how they responded, the percentage of questions they answered correctly, and the like. In some embodiments, conference organizers may be able to access the presentation files for each session during the conference and see the level of interest and use for each presentation. Highly popular presentations may be later promoted-similar to a TEDTalk—to increase commercial value of their conferences.

In some embodiments, the event server 110 may include an online platform that can be accessed by the plurality of participant computing devices 104 and/or the at least one presenter computing device 108. In some embodiments, the online platform may be developed from a Software As A Service Application (SaaS). In some embodiments, the online platform may be configured to create and configure new live meetings, manage blocks of live meetings, upload presentations and documents to be shared during live meetings, customize live meeting experiences, review engagement meetings, run and/or moderate meetings, and synchronize participant data and presentation data.

As shown in FIG. 1, in some embodiments, the event server 110 may be configured to execute the continuity break module 116 which identifies key moments, segments, and essential information within the live event to ensure that the plurality of participants 104 has a smooth catch-up experience when missing portions of the live event. In some embodiments, the continuity break module 116 may be implemented as an application (or set of instructions) or software/hardware combination configured to perform operations for allowing a participant to not attend portions of the live event without missing relevant or important materials or information.

At times during a conference or a presentation that is extended in length, participants may need to take a break or step out of the room for various reasons (e.g., restroom break, to take a call, to attend another presentation, etc.). In situations such as these, in some embodiments, the continuity break module 116 may provide, for example, a participant-specific summary of missed content to specific participant of the plurality of participants 104. In some embodiments, the continuity break module 116 may also provide a summary of participant-highlighted sections, allowing the plurality of participants 104 to easily review sections of the audio transcript that the plurality of participants 104 found most valuable. Thus, the continuity break module 116 seamlessly integrates participants back into an ongoing live event, aligning current content to minimize disruptions.

In some embodiments, the participant-specific summary of missed content can provide a description of any key topics, tasks, and files that were shared during the time that the plurality of participants 104 was unavailable. In more specific examples, the participant-specific summary can include reports on meetings, relevant sections of the presentation slides, excerpts of the transcription data, key topics of the transcription data, salient sections of a shared video, etc. In some embodiments, the participant-specific summary may have a character limit or maximum. For example, in some embodiments, the participant-specific summary may have a 140-character limit. In some embodiments, the participant-specific summary may include a link to a more detailed summary. In some embodiments, the participant-specific summary may include a link to relevant missed portions of the presentation slides and/or transcript. In some embodiments, each participant of the plurality of participants 104 may select how detailed of a summary he or she would like to be provided in a user preferences portion of the event engagement application 118.

In some embodiments, the continuity break module 116 may provide the participant-specific summary of missed content based on a defined start time, at which the participant-specific break begins, and a defined end time, at which the participant-specific break terminates. In some embodiments, the beginning of the participant-specific break may be determined by various methods, and a start time defined based thereon. In some embodiments, the continuity break module 116 may be initiated by a direct input by a specific participant of the plurality of participants 104. For example, in some embodiments, the specific participant may press the pause button 138 in the event engagement application 118. Once the pause button 138 is pressed, the continuity break module 116 may determine a start time at which the participant-specific summary of missed content begins. In some embodiments, the continuity break module 116 may allow other types of manual input to determine a start time for the participant-specific summary. For instance, a quick key, a particular gesture, or any other suitable input can be provided by the specific participant to determine a start time for the participant-specific summary.

In some embodiments, the continuity break module 116 may determine a time when the specific participant is unavailable based on changes in the specific participant's interaction and engagement with the event engagement application 118. For example, in some embodiments, if the specific participant's level of engagement with the event engagement application 118 drops below a threshold level, the continuity break module 116 may generate the participant-specific summary of the presentation content during the period of time in which the specific participant does not maintain a threshold level of engagement.

In some embodiments, the system 100 may use sensors and contextual data from a number of resources to detect whether a plurality of participants 104 has physically stepped out of the room.

In some embodiments, the continuity break module 116 may utilize contextual data from a location system to determine when a specific participant has left the presentation. In some embodiments, the continuity break module 116 may use geofencing to detect when a specific participant of the plurality of participants 104 has physically stepped out of a particular area. In some embodiments, the continuity break module 116 may use geofencing to detect when a specific participant of the plurality of participants 104 has physically stepped out of a particular area. In some embodiments, the location system may include systems such as a Wi-Fi network, GPS system, mobile network, etc. In some embodiments, the continuity break module 116 may use location data generated by a GPS system of the plurality of participant computing devices 102 to determine the location of a specific participant of the plurality of participants 104 as related to the location of the presentation. In some embodiments, the GPS location data may also be used to determine the timing of a specific participant of the plurality of participants 104 stepping out of a presentation temporarily and returning. Such information can be used to generate a summary of content that was shared or generated during a time period the participant was not in attendance.

In some embodiments, the continuity break module 116 may use contactless communication to detect when a specific participant of the plurality of participants 104 has physically stepped out of a particular area. In some embodiments, the system 100 may include at least one contactless communication device that includes a contactless communication reader. Additionally, in some embodiments, each of the plurality of participant computing devices 102 may include a contactless communication interface. In some embodiments, the contactless communication interface may be any short-range wireless communication interface, such as near field communication (NFC) and radio-frequency identification (RFID). In some embodiments, the contactless communication interface may be a NFC interface compliant with the ISO 18092/ECMA-340 standard. In some embodiments, this contactless communication device communicates with the contactless communication interface of the plurality of participant computing devices 102 when the plurality of participant computing devices 102 is within the contactless communication reader's communication field. In some embodiments, when the plurality of participant computing devices 102 is within data communication range of the contactless communication reader, the continuity break module 116 may register that the specific contactless communication tag of the participant-specific computing device of the plurality of participant computing devices 102 is in attendance. In some embodiments, if the tag is read again by the contactless communication reader, the continuity break module may register that the participant-specific computing device of the plurality of participants 104 has left the presentation. In some embodiments, the contactless communication data may be used to determine the timing of the specific participant of the plurality of participants 104 stepping out of a presentation temporarily and returning. Such information can be used to generate a user-specific summary of content that is generated during a time period the participant was not in attendance. In some embodiments, the contactless communication interface may be integrated into the plurality of participant computing devices 102. In some embodiments, the contactless communication interface may be a separate component that is connected to the plurality of participant computing devices 102 via, for example, a direct or wireless connection.

In some embodiments, the continuity break module 116 may use sensors to detect when a specific participant of the plurality of participants 104 has physically stepped out of a particular area. In some embodiments, the sensors may include any type of device that can monitor the activity of the plurality of participants 104. For instance, in some embodiments, a microphone and a camera may be used to generate activity data indicating the activity of the plurality of participants 104. In some embodiments, the activity data may be used to determine a level of engagement of a specific participant of the plurality of participants 104. When the specific participant's level of engagement drops below a threshold level, the continuity break module 116 may generate a participant-specific summary of the presentation content during the period of time in which the participant does not maintain a threshold level of engagement.

In some embodiments, continuity break module 116 may also detect periods of unavailability by the use of location information, calendar data, social network data, etc.

These examples are provided for illustrative purposes and are not to be construed as limiting. In some embodiments, the continuity break module 116 may utilize any type of contextual data that describes participant activity received from any type of resource to determine when a specific participant of the plurality of participants 104 leaves and/or returns to a presentation. Further, in some embodiments, the contextual data utilized to determine a participant level of engagement can come from any suitable resource or sensor in addition to those described herein. It can also be appreciated that, in some embodiments, contextual data from each of the resources described herein may be used in any combination to determine a participant's level of engagement with respect to any event. In some embodiments, a participant's scheduling data can be analyzed alone or in conjunction with other contextual data.

As discussed above, based on various participant engagement and location data, the continuity break module 116 may generate timeline data indicating a start time of a specific participant's break. As described above, in some embodiments, the start time may be generated based on a specific participant engagement falling below a threshold level. Similarly, based on various participant-specific engagement and location data, the continuity break module 116 may generate timeline data indicating an end time of the participant's break. In some embodiments, as the level of engagement increases above the predetermined threshold, the continuity break module 116 may generate timeline data indicating an end time of the specific participant's break. The start time and end time can be used to select portions of the presentation content for inclusion in the participant-specific summary.

In some embodiments, the participant-specific summary may be derived from engagement data from the specific participant of the plurality of participants 104 and other participants of the plurality of participants 104 associated with a number of networked computing devices of the system 100. In some embodiments, the engagement data that is shared between the computing devices can be managed by the event server 110. In some embodiments, the event server 110 may manage the exchange of engagement data communicated using the event engagement application 118 on each of the computing devices, such as video data, audio data, text-based communication, channel communication, chat communication, etc. In some embodiments, the engagement data may comprise additional data of any type, including, but not limited to, images, documents, metadata, etc.

In some embodiments, delivery of the participant-specific summary may be in response to a number of different factors. For instance, in some embodiments, the participant-specific summary may be delivered to a specific participant when his/her level of engagement exceeds, or returns to a level above, a threshold, as described above. In other embodiments, the participant-specific summary may be delivered to a specific participant when a response is triggered in the to the geofenced location indicating the specific participant has returned to the geofenced area. For example, in some embodiments, a participant-specific summary may be delivered when the specific participant returns to a meeting after leaving momentarily. In another example, the participant-specific summary may be delivered to a specific participant in response to a user input indicating a request for the participant-specific summary or an update for the participant-specific summary. In some configurations, sections of a participant-specific summary can be updated in real time during an event. Real-time updates for each event can help a user multitask and prioritize multiple events as the events unfold.

In some embodiments, the continuity break module 116 may be configured to utilize one or more machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments, the continuity break module 116 includes a machine learning engine 150. In some embodiments, the machine learning engine 150 may employ the Artificial Intelligence (AI)/machine learning techniques to monitor the transcription data and the presentation data to predict a participant-specific summary of missed content for a specific participant of the plurality of participants 104. In some embodiments, the machine learning engine 150 may be a large language model (LLM), GPT or other generative AI. In some embodiments, the machine learning engine 150 may be trained on user-specific input data input into the event engagement application 118 by the specific participant of the plurality of participants 104 at the live event. For example, in some embodiments, the machine learning engine 150 may provide the participant-specific summary of missed content for a specific participant based on the specific participant's preferences and previous engagement with the current presentation and past presentations, highlighting important insights, slides and discussions. In some embodiments, the machine learning engine 150 may be trained on historical user-specific input data input into the event engagement application 118 by the specific participant of the plurality of participants 104 at previous live events. In some embodiments, the machine learning engine 150 may be trained on user-specific input data input into the event engagement application 118 by other participants of the plurality of participants 104. In some embodiments, the machine learning engine 150 may be configured to analyze portions of the transcription data and the presentation data that have been highlighted or engaged with the most by other participants of the plurality of participants 104 and determines if these portions are relevant to the participant-specific summary. In some embodiments, the machine learning engine 150 may offer participant-specific recommendations for further topics and areas of further exploration, by a specific participant, based on the specific participant's interactions and behavior during the live event.

Figure 3:
FIG. 3 is a process flow diagram illustrating an example of a computer-based process for improving participant engagement and continuity at a live event, according to one or more embodiments of the present disclosure.

FIG. 3 is a process flow diagram illustration an example of an illustrative computer-mediated process 200 for facilitating participant engagement at a live event, according to one or more embodiments of the present disclosure. The exemplary computer-mediated process 200 may be executed by software, hardware or a combination thereof. For example, process 200 may be performed by including one or more components described in the system 100 of FIG. 1 (e.g., plurality of participant computing devices 102, presenter computing device 108 and event server 110).

At 205, the at least one presenter 112 uploads a presentation to the event server 110 at a live event from the at least one presenter computing device 108. In some embodiments, the presentation is uploaded via the event engagement application 118 on the at least one presenter computing device 108.

At 210, the presentation is transmitted to the event engagement application 118 executing on each of a plurality of participant computing devices 102 such that each of a plurality of participants 104 may engage with the presentation.

At 215, the at least one microphone records audio data at the live event, which is transmitted to the event server 110 in real time. In some embodiments, the audio data is transmitted to the event server 110 via the at least one presenter computing device 108. In some embodiments, the audio data is transmitted to the event server 110 directly from the at least one microphone.

At 220, the audio transcription application 128 transcribes the audio data into transcription data in real time.

At 225, the transcription data is transmitted, in real time, to the event engagement application 118 executing on the at least one presenter computing device 108 and/or the plurality of participant computing devices 102.

At 230, the event engagement application 118 displays the presentation data on the user interface 120 of each of the plurality of participant computing devices 102. In some embodiments, the presentation data is displayed on a presentation interface 132 of the event engagement application 118.

At 235, the event engagement application 118 displays the transcription data, in real time, on the user interface 120 of each of the plurality of participant computing devices 102. In some embodiments, the transcription data is displayed on a transcription interface 130 of the event engagement application 118.

At 240, at least one participant of the plurality of participants 104 provides at least one user-specific input data related to the presentation slides or the transcribed text via the user interface 120. In some embodiments, user-specific input data, as discussed above, may include, for example, highlighting of transcription text, marking of specific slides as relevant and/or important, responding to a poll or survey provided by the at least one presenter 112, etc. In some embodiments, the user-specific input may be provided via the tools of the user interface, as described above.

At 245, the user-specific input data provided by all participants of the plurality of participants 104 at the event is aggregated by the event engagement module 114 to form an aggregated user input data. In some embodiments, the aggregated user input data is stored in the cloud database of the event server 110.

At 250, the event server 110 generates a combined software container comprising a schema that embeds the user-specific input data into the transcription data. Specifically, in some embodiments, the aggregated user input data may be embedded into the transcription text to be displayed on each of the plurality of participant computing devices 102 for viewing by each plurality of participants 104 at the presentation.

At 255, the machine learning engine is trained on the user-specific input data to generate a participant-specific summary data. In some embodiments, the machine learning engine is also trained on historical user-specific input data. In some embodiments, the machine learning engine is also trained on historical user-specific input data provided by participants other than the specific plurality of participants 104.

At 260, the event engagement application 118 displays the combined software container on the user interface 120 of the plurality of participant computing devices 102. Specifically, in some embodiments, the aggregated user input data is displayed in the transcription text displayed on each of the plurality of participant computing devices 102 for vies by each plurality of participants 104 at the presentation.

At 265, a participant-specific summary is predicted, based on the user-specific input data, the historical user-specific input data and/or the historical user-specific input data of the other participants. In some embodiments, the participant-specific summary may include at least a portion of the combined software container that has been updated when the second user has performed at least one activity. Specifically, in some embodiments, the participant-specific summary may be predicted when the plurality of participants 104 leaves the presentation.

At 270, the event engagement application 118 displays the participant-specific summary data and the combined software container on the user interface 120 of the participant-specific computing device of the plurality of participant computing devices 102.

Figure 4:
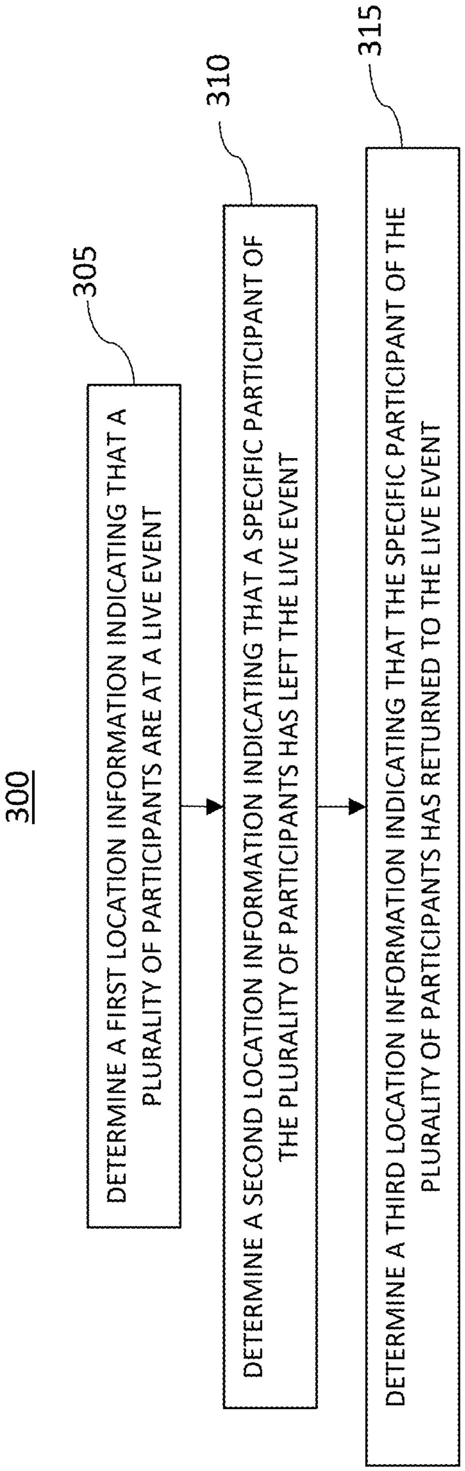
FIG. 4 is a process flow diagram illustrating an example of a computer-based process for improving participant engagement and continuity at a live event, according to one or more embodiments of the present disclosure.

FIG. 4 is a process flow diagram illustration an example of an illustrative computer-mediated process 300 for facilitating participant engagement at a live event, according to one or more embodiments of the present disclosure. The exemplary computer-mediated process 300 may be executed by software, hardware or a combination thereof. For example, process 300 may be performed by including one or more components described in the system 100 of FIG. 1 (e.g., plurality of participant computing devices 102, presenter computing device 108 and event server 110).

In some embodiments, the process 300 may include the steps of as the process 200 and may further include steps in which location information may be used to determine when the plurality of participants 104 has left or taken a break from the presentation. In some embodiments, steps 305 to 310 may be performed at any time before step 265 in the process 200.

At 305, the continuity break module 116 determines a first location information indicating that a plurality of participants 104 are at a live event. In some embodiments, the first location information is determined by at least one sensor, or a geofencing system.

At 310, the continuity break module 116 determines a second location information indicating that a specific participant of the plurality of participants 104 has left the live event. In some embodiments, the first location information is determined by at least one sensor, or a geofencing system.

At 315, the continuity break module 116 determines a third location information indicating that the specific participant of the plurality of participants 104 has returned to the live event. In some embodiments, the first location information is determined by at least one sensor, or a geofencing system.

Figure 5:
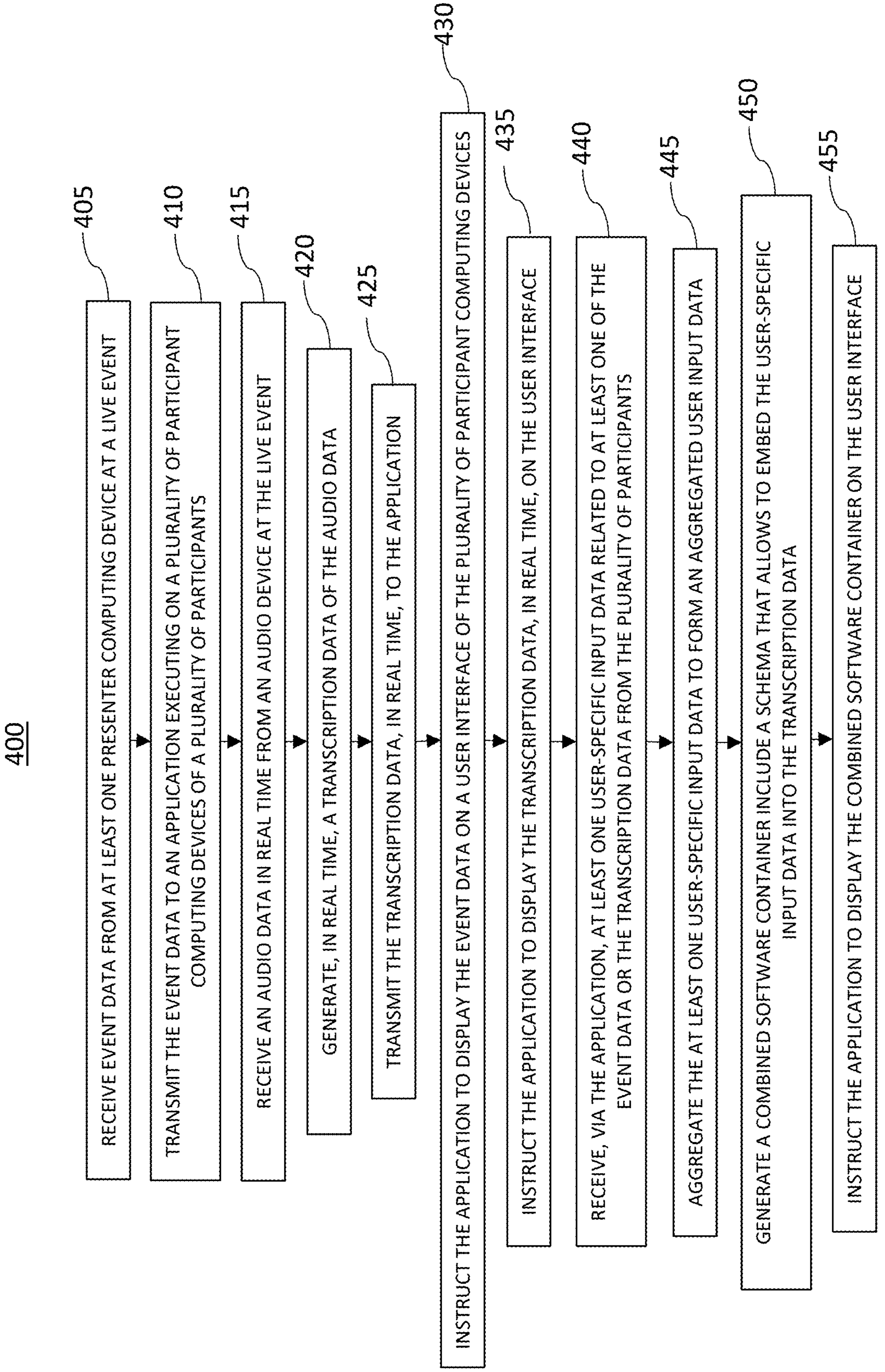
FIG. 5 is a process flow diagram illustrating an example of a computer-based process for improving participant engagement and continuity at a live event, according to one or more embodiments of the present disclosure.

FIG. 5 is a process flow diagram illustration an example of an illustrative computer-mediated process 400 for facilitating participant engagement at a live event, according to one or more embodiments of the present disclosure. The exemplary computer-mediated process 400 may be executed by software, hardware or a combination thereof. For example, process 400 may be performed by including one or more components described in the system 100 of FIG. 1 (e.g., plurality of participant computing devices 102, presenter computing device 108 and event server 110).

At 405, the at least one presenter 112 uploads a presentation to the event server 110 at a live event from the at least one presenter computing device 108. In some embodiments, the presentation is uploaded via the event engagement application 118 on the at least one presenter computing device 108.

At 410, the presentation is transmitted to the event engagement application 118 executing on each of a plurality of participant computing devices 102 such that each of a plurality of participants 104 may engage with the presentation.

At 415, the at least one microphone records audio data at the live event, which is transmitted to the event server 110 in real time by, for example, the at least one presenter computing device 108.

At 420, the audio transcription application 128 transcribes the audio data into transcription data in real time.

At 425, the transcription data is transmitted, in real time, to the event engagement application 118 executing on the plurality of participant computing devices 102 of a plurality of participants.

At 430, the event engagement application 118 displays the presentation on the user interface 120 of each of the plurality of participant computing devices 102.

At 435, the event engagement application 118 displays the transcription data, in real time, on the user interface 120 of each of the plurality of participant computing devices 102.

At 440, a plurality of participants 104 receiving inputs at least one user-specific input data related to the presentation slides or the transcribed text via the user interface 120. In some embodiments, user-specific input data, as discussed above, may include, for example, highlighting of transcription text, marking of specific slides as relevant and/or important, responding to a poll or survey provided by the at least one presenter 112, etc. In some embodiments, the user-specific input may be provided via the tools of the user interface, as described above.

At 445, the user-specific input data provided by all participants at the event is aggregated by the event server 110 to form an aggregated user input data. In some embodiments, the aggregated user input data is stored in the cloud database of the event server 110.

At 450, the event server 110 generates a combined software container comprising a schema that allows to embed the user-specific input data into the transcription data. Specifically, the aggregated user input data may be embedded into the transcription text to be displayed on each plurality of participant computing devices 102 for viewing by each plurality of participants 104 at the presentation.

At 455, the event engagement application 118 displays the combined software container on the user interface 120 of the plurality of participant computing devices 112. Specifically, in some embodiments, the aggregated user input data is displayed in the transcription text displayed on each of the plurality of participant computing devices 102 for vies by each plurality of participants 104 at the presentation.

Figure 6:
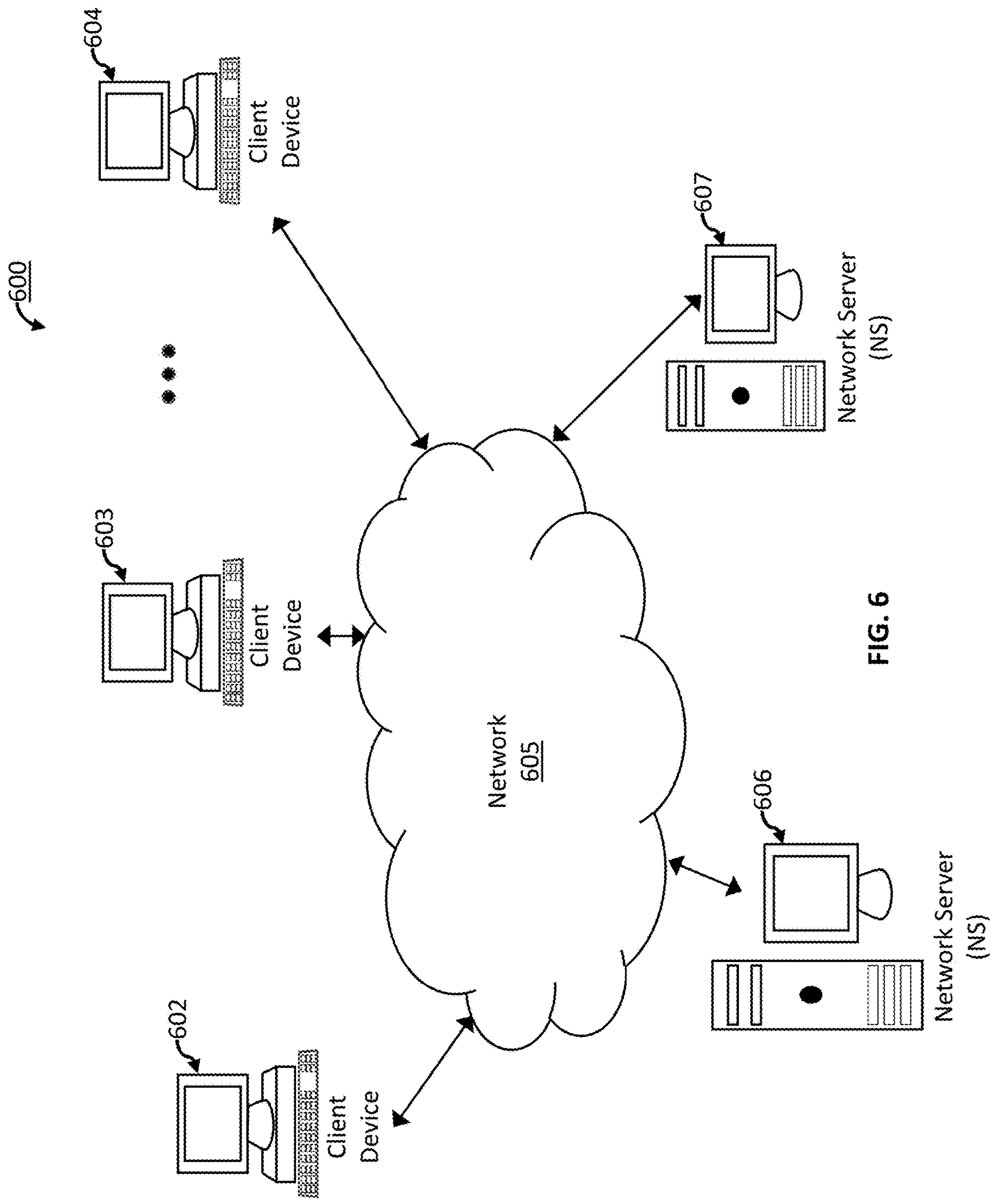
FIG. 6 is a block diagram illustrating an exemplary computer-based system and platform, according to one or more embodiments of the present disclosure.

FIG. 6 depicts a block diagram of an exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, member computing device 602, member computing device 603 through member computing device 604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Apache on Linux or Microsoft IIS (Internet Information Services). In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 7:
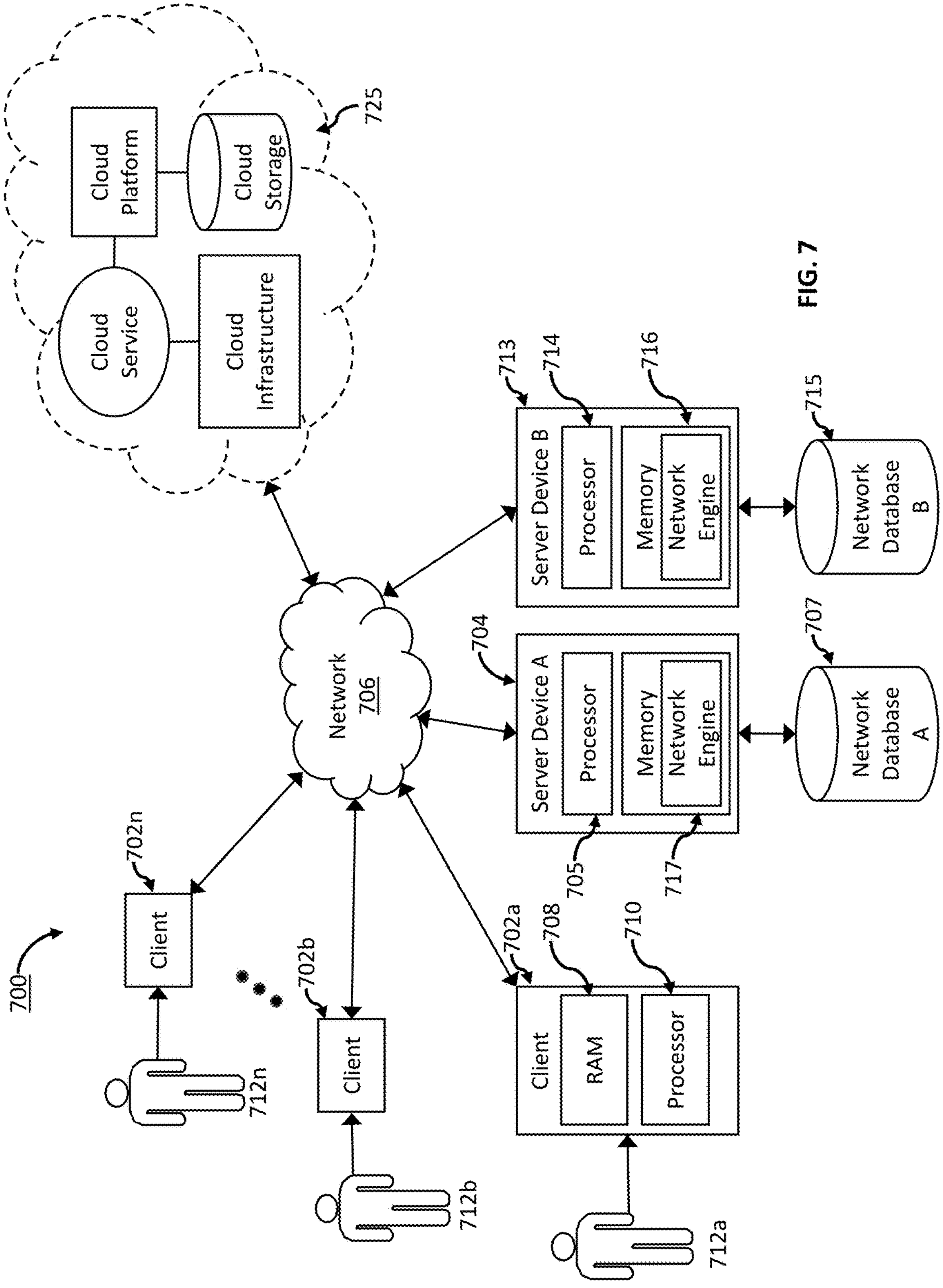
FIG. 7 is a block diagram illustrating another exemplary computer-based system and platform, according to one or more embodiments of the present disclosure.

FIG. 7 depicts a block diagram of another exemplary computer-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 702*a*, member computing device 702*b* through member computing device 702*n* shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702*a* through 702*n* may also comprise a number of external or internal devices such as a mouse, a CD-ROM, DVD, a physical or virtual keyboard, a display, or other input or output devices. In some embodiments, examples of member computing devices 702*a* through 702*n* (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702*a* through 702*n* may be specifically programmed with one or more application programs in accordance with one or more principles/methodologies detailed herein. In some embodiments, member computing devices 702*a* through 702*n* may operate on any operating system capable of supporting a browser or browser-enabled application, such as Microsoft™ Windows™, and/or Linux. In some embodiments, member computing devices 702*a* through 702*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702*a* through 702*n*, user 712*a*, user 712*b* through user 712*n*, may communicate over the exemplary network 706 with each other and/or with other systems and/or devices coupled to the network 706. As shown in FIG. 7, exemplary server devices 704 and 713 may include processor 705 and processor 714, respectively, as well as memory 717 and memory 716, respectively. In some embodiments, the server devices 704 and 713 may be also coupled to the network 706. In some embodiments, one or more member computing devices 702*a* through 702*n* may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
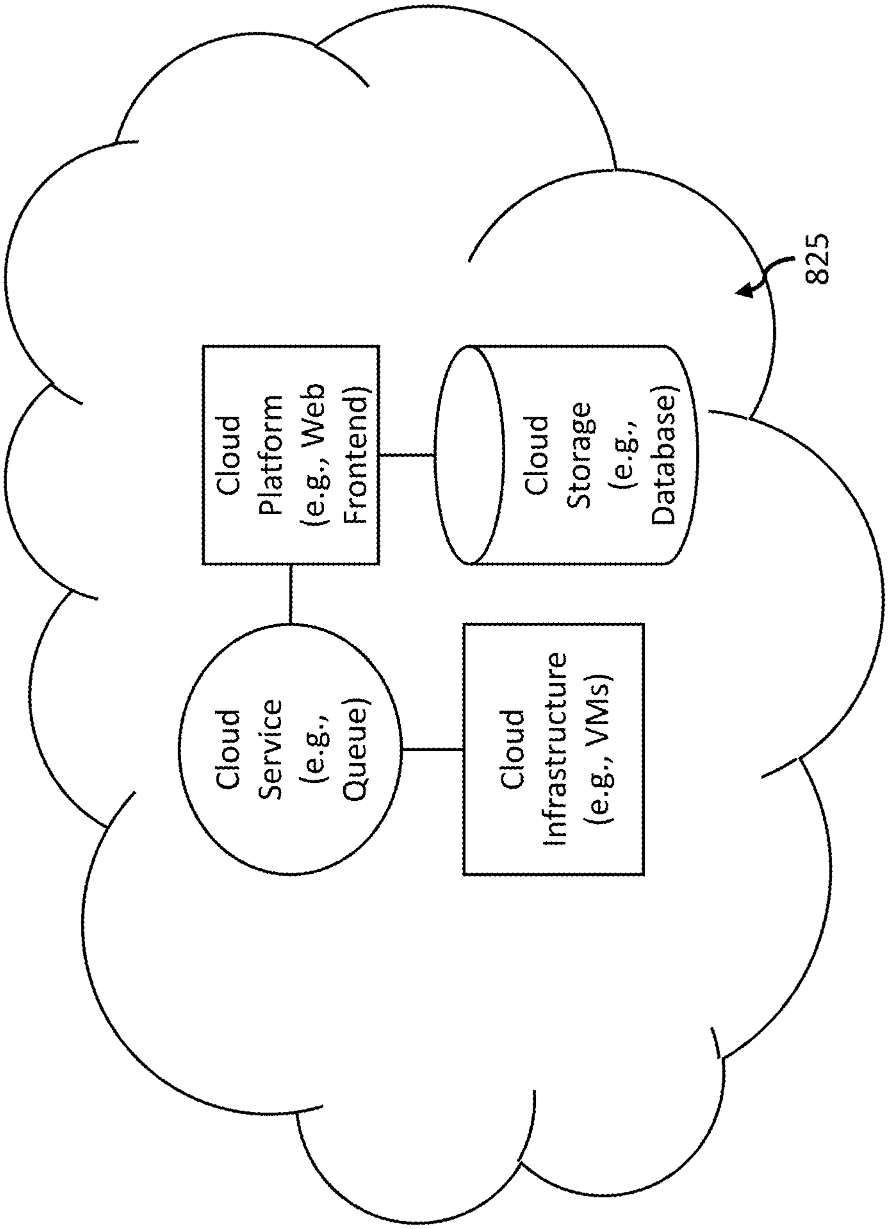
FIG. 8 is a schematic illustration of an exemplary implementation of a cloud computing/architecture(s) in which the exemplary inventive computer-based system and platform of the present disclosure may be specifically configured to operate, according to one or more embodiments of the present disclosure.
Figure 9:
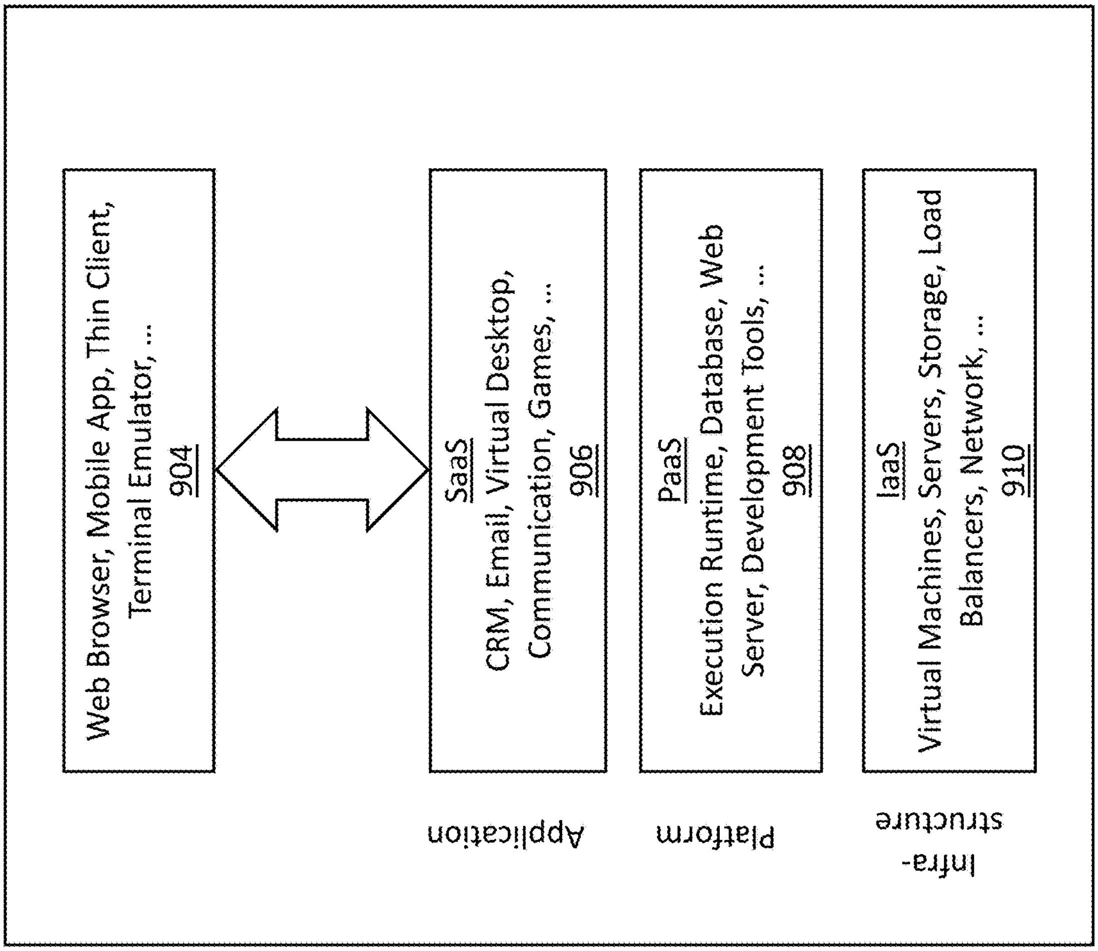
FIG. 9 is another schematic illustration of an exemplary implementation of a cloud computing/architecture(s) in which the exemplary inventive computer-based system and platform of the present disclosure may be specifically configured to operate, according to one or more embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 825 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A computer-implemented method including:

receiving, by at least one processor, event data from a first computing device of a first user of a plurality of users; where the event data is associated with a live event;

transmitting, by the at least one processor, the event data to an application executing on a plurality of second computing devices of a plurality of second users of the plurality of users;

receiving, by the at least one processor, an audio data in real-time from an audio device at the live event;

generating, by the at least one processor, in real time, a transcription data of the audio data;

transmitting, by the at least one processor, the transcription data, in real time, to the application executing on the plurality of second computing devices of a plurality of second users of the plurality of users;

instructing, by the at least one processor, the application to display the event data on a user interface of the plurality of second computing devices;

instructing, by the at least one processor, the application to display the transcription data, in real time, on the user interface of the plurality of second computing devices;

receiving, by the at least one processor, via the application executing on the plurality second computing devices, at least one user-specific input data related to at least one of the event data or the transcription data from the plurality of second users of the plurality of users;

where the at least one user-specific input data is provided to the application via the user interface of the plurality of second computing devices;

where the user interface includes at least one tool for providing the user-specific input data via the application;

aggregating, by the at least one processor, the at least one user-specific input data to form an aggregated user input data;

generating, by the at least one processor, a combined software container including a schema that allows to embed the user-specific input data into the transcription data;

training, by the at least one processor, a machine learning engine based on the combined software container to obtain a trained machine learning engine that is trained to generate a user-specific summary data;

instructing, by the at least one processor, the application to display the combined software container on the user interface of the plurality of second computing devices;

predicting, by the at least one processor, based on an historical user-specific input data of a second user of the plurality of second users and via the trained machine learning engine, a user-specific summary data;

where the user-specific summary data includes at least one portion of the combined software container that has been updated when the second user has performed at least one activity; and instructing, by the at least one processor, the application to display the user-specific summary data and the combined software container on the user interface of a second computing device of the second user of the plurality of second users.

2. The method of clause 1, where the user-specific input data includes at least one of highlighting of at least one portion of the transcription data, highlighting of at least one portion of the event data, a response to at least one polling question or a comment on at least one of the event data or the transcription data.

3. The method of clause 1, where the at least one activity includes at least one of leaving the live event and returning to the live event.

4. The method of clause 1, where the user interface includes at least one of an event data interface, a transcription data interface, a presentation interface, a participant engagement interface and an announcements display.

5. The method of clause 1, further including: receiving, by the at least one processor, a first location information indicating that the plurality of second users are at the live event; where the location information is provided by at least one of at least one sensor, a GPS system or a beacon system.

6. The method of clause 5, further including: receiving, by the at least one processor, a second location information indicating that the second user of the plurality of second users has performed the activity; where the activity includes the second user leaving the event.

7. The method of clause 1, where the audio data is recorded by a microphone at the live event.

8. The method of clause 1, further including: receiving, by the at least one processor, a video data in real-time from an video device at the live event; and instructing, by the at least one processor, the application to display the video data, in real time, on the user interface of the plurality of second computing devices.

9. A system including:

a computing device configured to execute software instructions that cause the computing device to at least:

receive event data from a first computing device of a first user of a plurality of users;

where the event data is associated with a live event;

transmit the event data to an application executing on a plurality of second computing devices of a plurality of second users of the plurality of users;

receive an audio data in real-time from an audio device at the live event;

generate, in real time, a transcription data of the audio data;

transmit the transcription data, in real time, to the application executing on the plurality of second computing devices of a plurality of second users of the plurality of users;

instruct the application to display the event data on a user interface of the plurality of second computing devices;

instruct the application to display the transcription data, in real time, on the user interface of the plurality of second computing devices;

receive, via the application executing on the plurality of second computing devices, at least one user-specific input data related to at least one of the event data or the transcription data from the second users of the plurality of users;

where the at least one user-specific input data is provided to the application via the user interface of the plurality of second computing devices;

where the user interface includes at least one tool for providing the user-specific input data via the application;

aggregate the at least one user-specific input data to form an aggregated user input data;

generate a combined software container including a schema that allows to embed the user-specific input data into the transcription data;

train a machine learning engine based on the combined software container to obtain a trained machine learning engine that is trained to generate a user-specific summary data;

instruct the application to display the combined software container on the user interface of the plurality of second computing devices;

predict, based on an historical user-specific input data of a second user of the plurality of second users and via the trained machine learning engine, a user-specific summary data;

where the user-specific summary data includes at least one portion of the combined software container that has been updated when the second user has performed at least one activity;

instruct the application to display the user-specific summary data and the combined software container on the user interface of a second computing device of the second user of the plurality of second users.

10. The system of clause 9, where the user-specific input data includes at least one of highlighting of at least one portion of the transcription data, highlighting of at least one portion of the event data, a response to at least one polling question or a comment on at least one of the event data or the transcription data.

11. The system of clause 9, where the at least one activity includes at least one of leaving the live event and returning to the live event.

12. The system of clause 9, where the user interface includes at least one of an event data interface, a transcription data interface, a presentation interface, a participant engagement interface and an announcements display.

13. The system of clause 9, where the software instructions, when executed, further cause the computing device to perform steps to:

receive a first location information indicating that the plurality of second users are at the live event;

where the location information is provided by at least one of at least one sensor, a GPS system or a beacon system.

14. The system of clause 13, where the software instructions, when executed, further cause the computing device to perform steps to:

receive a second location information indicating that the second user of the plurality of second users has performed the activity;

where the activity includes the second user leaving the event.

15. The system of clause 9, where the audio data is recorded by a microphone at the live event.

16. The system of clause 9, where the software instructions, when executed, further cause the computing device to perform steps to:

receive a video data in real-time from an video device at the live event; and instruct the application to display the video data, in real time, on the user interface of the plurality of second computing devices.

17. A computer-implemented method including:

receiving, by at least one processor, event data from a first computing device of a first user of a plurality of users;

where the event data is associated with a live event;

transmitting, by the at least one processor, the event data to an application executing on a plurality of second computing devices of a plurality of second users of the plurality of users;

receiving, by the at least one processor, an audio data in real-time from an audio device at the live event;

generating, by the at least one processor, in real time, a transcription data of the audio data;

transmitting, by the at least one processor, the transcription data, in real time, to the application executing on the plurality of second computing devices of a plurality of second users of the plurality of users;

instructing, by the at least one processor, the application to display the event data on a user interface of the plurality of second computing devices;

instructing, by the at least one processor, the application to display the transcription data, in real time, on the user interface of the plurality of second computing devices;

receiving, by the at least one processor, via the application executing on the at least one second computing device, at least one user-specific input data related to at least one of the event data or the transcription data from the plurality of second users of the plurality of users;

where the at least one user-specific input data is provided to the application via the user interface of the plurality of second computing devices;

where the user interface includes at least one tool for providing the user-specific input data via the application;

aggregating, by the at least one processor, the at least one user-specific input data to form an aggregated user input data;

generating, by the at least one processor, a combined software container including a schema that allows to embed the user-specific input data into the transcription data;

instructing, by the at least one processor, the application to display the combined software container on the user interface of the plurality of second computing devices.

18. The method of clause 17, where the event data includes at least a presentation including a plurality of slides.

19. The method of clause 17, where the user-specific input data includes at least one of highlighting of at least one portion of the transcription data, highlighting of at least one portion of the event data, a response to at least one polling question or a comment on at least one of the event data or the transcription data.

20. The method of clause 17, where the user interface includes at least one of an event data interface, a transcription data interface, a presentation interface, a participant engagement interface and an announcements display.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A computer-implemented method comprising:

receiving, by at least one processor, event data from a first computing device of a first user of a plurality of users;

wherein the event data is associated with a live event;

transmitting, by the at least one processor, the event data to an application executing on a plurality of second computing devices of a plurality of second users of the plurality of users;

receiving, by the at least one processor, an audio data in real-time from an audio device at the live event;

generating, by the at least one processor, in real time, a transcription data of the audio data;

transmitting, by the at least one processor, the transcription data, in real time, to the application executing on the plurality of second computing devices of a plurality of second users of the plurality of users;

instructing, by the at least one processor, the application to display the event data on a user interface of the plurality of second computing devices;

instructing, by the at least one processor, the application to display the transcription data, in real time, on the user interface of the plurality of second computing devices;

receiving, by the at least one processor, via the application executing on the plurality second computing devices, at least one user-specific input data related to at least one of the event data or the transcription data from the plurality of second users of the plurality of users;

wherein the at least one user-specific input data is provided to the application via the user interface of the plurality of second computing devices;

wherein the user interface comprises at least one tool for providing the user-specific input data via the application;

aggregating, by the at least one processor, the at least one user-specific input data to form an aggregated user input data;

generating, by the at least one processor, a combined software container comprising a schema that allows to embed the user-specific input data into the transcription data;

training, by the at least one processor, a machine learning engine based on the combined software container to obtain a trained machine learning engine that is trained to generate a user-specific summary data;

instructing, by the at least one processor, the application to display the combined software container on the user interface of the plurality of second computing devices;

predicting, by the at least one processor, based on an historical user-specific input data of a second user of the plurality of second users and via the trained machine learning engine, a user-specific summary data;

wherein the user-specific summary data comprises at least one portion of the combined software container that has been updated when the second user has performed at least one activity; and instructing, by the at least one processor, the application to display the user-specific summary data and the combined software container on the user interface of a second computing device of the second user of the plurality of second users.

2. The method of claim 1, wherein the user-specific input data comprises at least one of highlighting of at least one portion of the transcription data, highlighting of at least one portion of the event data, a response to at least one polling question or a comment on at least one of the event data or the transcription data.

3. The method of claim 1, wherein the at least one activity comprises at least one of leaving the live event and returning to the live event.

4. The method of claim 1, wherein the user interface comprises at least one of an event data interface, a transcription data interface, a presentation interface, a participant engagement interface and an announcements display.

5. The method of claim 1, further comprising:

receiving, by the at least one processor, a first location information indicating that the plurality of second users are at the live event;

wherein the location information is provided by at least one of at least one sensor, a GPS system or a beacon system.

6. The method of claim 5, further comprising:

receiving, by the at least one processor, a second location information indicating that the second user of the plurality of second users has performed the activity;

wherein the activity comprises the second user leaving the event.

7. The method of claim 1, wherein the audio data is recorded by a microphone at the live event.

8. The method of claim 1, further comprising:

receiving, by the at least one processor, a video data in real-time from an video device at the live event; and instructing, by the at least one processor, the application to display the video data, in real time, on the user interface of the plurality of second computing devices.

9. A system comprising:

a computing device configured to execute software instructions that cause the computing device to at least:

receive event data from a first computing device of a first user of a plurality of users;

wherein the event data is associated with a live event;

transmit the event data to an application executing on a plurality of second computing devices of a plurality of second users of the plurality of users;

receive an audio data in real-time from an audio device at the live event;

generate, in real time, a transcription data of the audio data;

transmit the transcription data, in real time, to the application executing on the plurality of second computing devices of a plurality of second users of the plurality of users;

instruct the application to display the event data on a user interface of the plurality of second computing devices;

instruct the application to display the transcription data, in real time, on the user interface of the plurality of second computing devices;

receive, via the application executing on the plurality of second computing devices, at least one user-specific input data related to at least one of the event data or the transcription data from the second users of the plurality of users;

wherein the at least one user-specific input data is provided to the application via the user interface of the plurality of second computing devices;

wherein the user interface comprises at least one tool for providing the user-specific input data via the application;

aggregate the at least one user-specific input data to form an aggregated user input data;

generate a combined software container comprising a schema that allows to embed the user-specific input data into the transcription data;

train a machine learning engine based on the combined software container to obtain a trained machine learning engine that is trained to generate a user-specific summary data;

instruct the application to display the combined software container on the user interface of the plurality of second computing devices;

predict, based on an historical user-specific input data of a second user of the plurality of second users and via the trained machine learning engine, a user-specific summary data;

wherein the user-specific summary data comprises at least one portion of the combined software container that has been updated when the second user has performed at least one activity;

instruct the application to display the user-specific summary data and the combined software container on the user interface of a second computing device of the second user of the plurality of second users.

10. The system of claim 9, wherein the user-specific input data comprises at least one of highlighting of at least one portion of the transcription data, highlighting of at least one portion of the event data, a response to at least one polling question or a comment on at least one of the event data or the transcription data.

11. The system of claim 9, wherein the at least one activity comprises at least one of leaving the live event and returning to the live event.

12. The system of claim 9, wherein the user interface comprises at least one of an event data interface, a transcription data interface, a presentation interface, a participant engagement interface and an announcements display.

13. The system of claim 9, wherein the software instructions, when executed, further cause the computing device to perform steps to:

receive a first location information indicating that the plurality of second users are at the live event;

wherein the location information is provided by at least one of at least one sensor, a GPS system or a beacon system.

14. The system of claim 13, wherein the software instructions, when executed, further cause the computing device to perform steps to:

receive a second location information indicating that the second user of the plurality of second users has performed the activity;

wherein the activity comprises the second user leaving the event.

15. The system of claim 9, wherein the audio data is recorded by a microphone at the live event.

16. The system of claim 9, wherein the software instructions, when executed, further cause the computing device to perform steps to:

receive a video data in real-time from an video device at the live event; and instruct the application to display the video data, in real time, on the user interface of the plurality of second computing devices.

17. A computer-implemented method comprising:

receiving, by at least one processor, event data from a first computing device of a first user of a plurality of users; wherein the event data is associated with a live event;

transmitting, by the at least one processor, the event data to an application executing on a plurality of second computing devices of a plurality of second users of the plurality of users;

receiving, by the at least one processor, an audio data in real-time from an audio device at the live event;

generating, by the at least one processor, in real time, a transcription data of the audio data;

transmitting, by the at least one processor, the transcription data, in real time, to the application executing on the plurality of second computing devices of a plurality of second users of the plurality of users;

instructing, by the at least one processor, the application to display the event data on a user interface of the plurality of second computing devices;

instructing, by the at least one processor, the application to display the transcription data, in real time, on the user interface of the plurality of second computing devices;

receiving, by the at least one processor, via the application executing on the at least one second computing device, at least one user-specific input data related to at least one of the event data or the transcription data from the plurality of second users of the plurality of users;

wherein the at least one user-specific input data is provided to the application via the user interface of the plurality of second computing devices;

wherein the user interface comprises at least one tool for providing the user-specific input data via the application;

aggregating, by the at least one processor, the at least one user-specific input data to form an aggregated user input data;

generating, by the at least one processor, a combined software container comprising a schema that allows to embed the user-specific input data into the transcription data;

instructing, by the at least one processor, the application to display the combined software container on the user interface of the plurality of second computing devices;

predicting, by the at least one processor, based on a historical user-specific input data of a second user of the plurality of second users and via a machine learning engine, a user-specific summary data;

wherein the user-specific summary data comprises at least one portion of the combined software container that has been updated when the second user has performed at least one activity; and instructing, by the at least one processor, the application to display the user-specific summary data and the combined software container on the user interface of a second computing device of the second user of the plurality of second users.

18. The method of claim 17, wherein the event data comprises at least a presentation comprising a plurality of slides.

19. The method of claim 17, wherein the user-specific input data comprises at least one of highlighting of at least one portion of the transcription data, highlighting of at least one portion of the event data, a response to at least one polling question or a comment on at least one of the event data or the transcription data.

20. The method of claim 17, wherein the user interface comprises at least one of an event data interface, a transcription data interface, a presentation interface, a participant engagement interface and an announcements display.

* * * * *